UNITED STATES PATENT OFFICE.

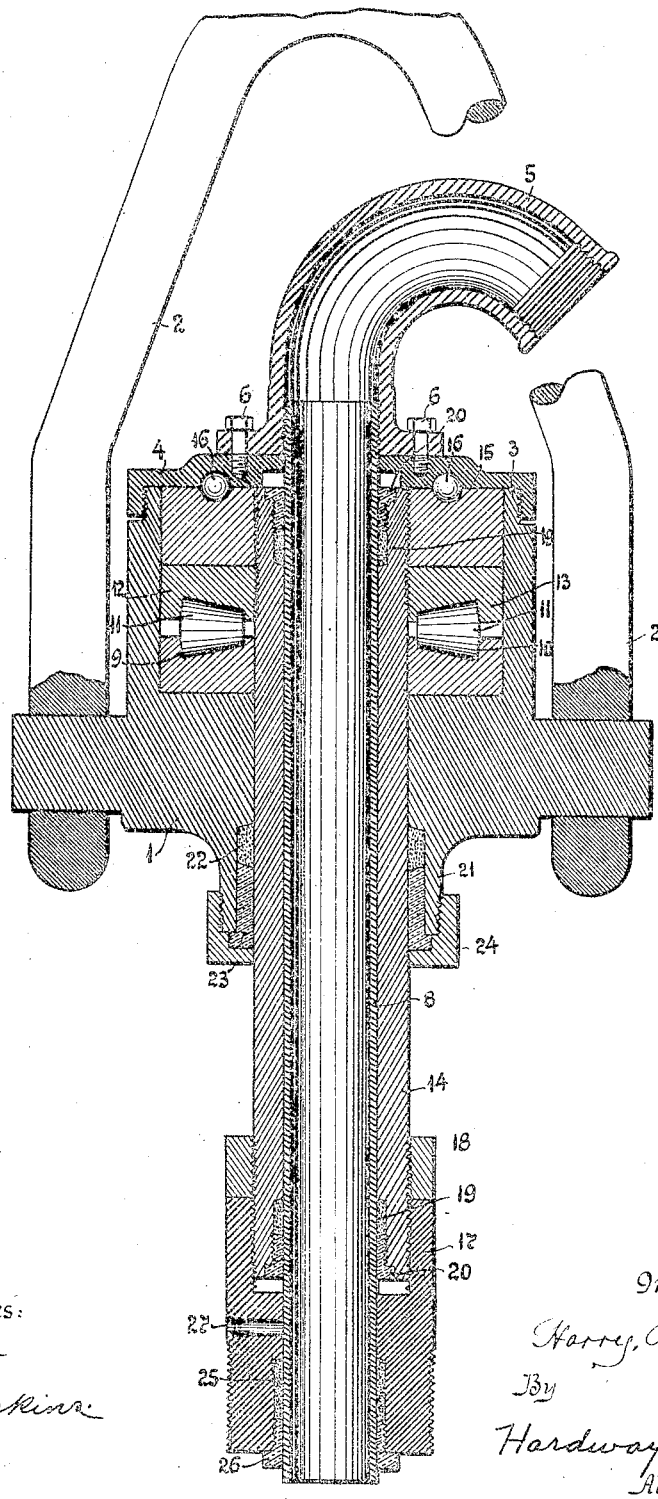

HARRY R. DECKER, OF HOUSTON, TEXAS.

HYDRAULIC SWIVEL.

1,125,977.                Specification of Letters Patent.          Patented Jan. 26, 1915.

Application filed February 11, 1911. Serial No. 607,983.

*To all whom it may concern:*

Be it known that I, HARRY R. DECKER, a citizen of the United States, residing at Houston, in the county of Harris and State of Texas, have invented certain new and useful Improvements in Hydraulic Swivels, of which the following is a specification.

My invention relates to new and useful improvements in hydraulic swivels, and more particularly to that character of swivels designed for use in connection with rotary well drilling machines, where water is conducted under pressure from a pump to the point of a drill secured upon the lower end of a rotating drill stem.

The object of the invention is to provide a device of the character described having a stationary part, and a rotatable part, the latter being rotatable relative to the former and carrying a drill stem suspended therefrom, it being the prime object to support a supply hose in a given position and retain the same against movement in relation to the rotating drill stem while supplying it with water. The coöperating parts have suitable packing therebetween to prevent the escape of oil from or the introduction of water to the internal mechanism of the swivel.

With the above and other objects in view my invention has particular relation to certain novel features of construction, operation and arrangement of parts, an example of which is given in this specification and illustrated in the accompanying drawing, wherein:—the figure is a sectional side elevation of the swivel.

Referring now more particularly to the drawing, the numeral 1 designates a hollow trunnion block which is supported by the bail 2, which is secured on the projecting reduced ends of the trunnion block. This bail is attached to any preferred tackle carried by a suitable derrick and the swivel thus suspended in the desired position. The trunnion block 1, has an upstanding rim or casing 3, integral therewith, upon which a cap 4 is screwed, thus forming an inclosed chamber in which the operative mechanism of the swivel is incased.

The numeral 5 refers to a neck, which is secured on cap 4 by means of set bolts 6, and to which any preferred form of supply hose may be attached, the hose being designed to conduct the water, under pressure from a suitable force pump, (not shown) to neck 5 and thence to the drill stem.

The numeral 8 refers to a stationary hose stem, whose upper end is screwed into the lower end of neck 5 and which extends through cap 4, trunnion 1 and is designed to conduct the water from neck 5 and discharge the same into a drill stem (not shown) which the swivel is designed to support.

Mounted within and resting upon the lower surface of the trunnion block 1 is an annular collar 9 formed with a race way ring 10 to receive the anti-friction bearings 11.

The numeral 12 refers to a similar collar formed with a race way ring 13 to receive and seat on bearings 11, which maintain a space between said collars. The collar 12 is screwed on to the upper end of the swivel stem 14 and secured thereon by means of lock nut 15 which is screwed on to the upper extremity of said swivel stem and rests against said collar 12. The under face of cap 4 and the upper face of lock nut 15 are provided with coinciding bearing-receiving grooves, which receive the bearings 16 which minimize the friction between said cap and nut.

The swivel stem 14 surrounds the hose stem 8 closely and in operation revolves about the same and extends up into the chamber of the trunnion block and through ring 9 and carries at its upper end ring 12 and lock nut 15, heretofore described, thus forming the rotatable part of the swivel. The lower end of the swivel stem 14 is exteriorly threaded and a casing-bushing 17 fitted to the same. A jam collar 18 is also threaded upon it for firmly locking the two and obviating danger of said bushing working loose and unscrewing with the drill stem section 7 to be screwed onto the lower end of said bushing. Suitable packing 19 is interposed between the upper and lower ends of the drill stem 14 and the hose stem 8, and is secured in place by the glands 20 which are screwed in the ends of the swivel stem against said packing. These packing rings effectually prevent the circulation of water between said stems as well as prevent the escape of the lubricating oil therefrom.

A collar 21 surrounds stem 14 just below and preferably formed integral with the trunnion block 1. It is chambered forming a stuffing box which is filled with a suitable packing 22. This packing is held in place by gland 23 which surrounds the swivel stem and is secured in position by cap nut 24, which is threaded over the collar 21 and rests against the lower end of said gland 23. This packing effectually prevents the escape of the lubricating fluid from the chamber of the trunnion block 1. The numeral 25 refers to a packing which is interposed between the lower end of bushing 17 and the hose stem 8 and which is secured in position by means of gland 26 which surrounds said hose stem and is screwed into the lower end of said bushing and rests against said packing. This packing is designed to prevent the escape of water through between said hose stem and bushing but in case any water should so escape the same may be discharged through the perforation 27 provided in said bushing for the escapement thereof.

The various joints uniting the members of the rotatable part, as well as those connecting said part to the drill stem and the joint connecting the hose stem to the neck 5 are screw connections, the threads of these connections having a pitch which will cause the rotation of the drill stem to tighten rather than loosen said joints.

In drilling through soft stratum the drill stem is suspended from the swivel and the rotatable part of the swivel rotates on bearings 11 but when rock or other hard stratum is encountered, the drill stem may be entirely supported from beneath by said stratum, in which case the bearings 16 will be brought into play and then serve to minimize the friction between the cap 4 and the rotatable part of the swivel.

In operation the bail 2, being supported by any preferred tackle carried by a suitable derrick, supports the elements carried by the trunnion block, and the swivel is brought into line with the section of the drill stem, and the lower end of the swivel stem 14 is connected to the drill stem 7 through the casing-bushing 17. The water may now be forced through neck 5 and it will find its way down through the hose stem 8 and into the drill stem from which it passes through holes for the purpose formed in the drill point that is screwed to the bottom end of the drill stem or casing, the said stem being given a rotary motion by any of the well known means, said means not being shown in the drawing. During operation the swivel stem 14, collar 12, lock nut 15 and bushing 17 will rotate with the drill stem, to which the parts are connected. The collar 9, bail 2, trunnion block 1, cap 4 and the neck 5 and the hose stem connected thereto will remain stationary.

It will be apparent that the coöperating elements of the swivel, carried by the trunnion block, will be incased in an inclosed chamber which may be filled with any suitable lubricating fluid and by reason of the disposition of the packing rings and joints, said fluid cannot escape from, nor can water enter into the incasement; it is also apparent that by reason of the disposition of said packing and joints the water forced through said swivel and into the drill stem will be prevented from escaping and the chief defects of hydraulic swivels now in common use thus overcome and the prime objects of my invention thus attained.

What I claim is:—

1. A hydraulic swivel including a trunnion block, a supporting bail therefor, an upstanding annular rim carried by said block, a swivel stem extending up into the block and whose upper end terminates within the same, a collar surrounding said swivel stem and resting upon the upper side of said trunnion block, a similar collar spaced above the first mentioned collar and secured to the upper end of the swivel stem, a lock nut secured on said swivel stem and locking the last mentioned collar thereon, antifriction bearings interposed between said collars, a cap secured to the upper edge of said upstanding rim and entirely inclosing said collars, said antifriction means and said locknut, a neck secured to said cap, a hose stem within said swivel stem, and independently rotatable relative thereto, whose upper end extends through said cap and is secured to the lower end of said neck, suitable packing interposed between the hose stem and the upper and lower ends of the swivel stem, suitable packing interposed between the trunnion block and swivel stem and arranged beneath said collars, and a bushing carried by the lower end of said swivel stem and surrounding the lower extremity of the hose stem.

2. A hydraulic swivel including a trunnion block, a supporting bail therefor, an upstanding annular rim carried by said block and integral therewith, a swivel stem whose upper end extends up into and terminates within the block, a collar surrounding said swivel stem and resting upon the upper side of said trunnion block, a similar collar spaced above the first mentioned collar and secured to the upper end of the swivel stem, a lock nut secured on said swivel stem and locking the last mentioned collar thereon, anti-friction means interposed between said collars, a cap secured to the upper edge of said upstanding rim and entirely inclosing said collars, said anti-friction means, said lock nut and the upper end of said swivel stem, a neck detachably secured to said cap, antifriction means interposed between said cap and lock nut and a hose stem within said swivel stem and independently rotatable relative thereto, whose upper end extends through said cap and is secured to the lower end of said neck.

3. A hydraulic swivel including a trunnion block, a supporting bail therefor, an upstanding annular rim carried by said block, a swivel stem extending up into the block and whose upper end terminates within the same, a collar surrounding said swivel stem and resting upon the upper side of said trunnion block, a similar collar spaced above the first mentioned collar and surrounding the upper end of the swivel stem, a lock nut secured on said swivel stem and locking the last mentioned collar thereon, antifriction bearings interposed between said collars, a cap secured to the upper edge of said upstanding rim and entirely inclosing said collars, said antifriction means and said locknut, a neck secured to said cap, a hose stem within said swivel stem and independently rotatable relative thereto, whose upper end extends through said cap and is secured to the lower end of said neck, suitable packing interposed between the hose stem and one end of the swivel stem, suitable packing interposed between the trunnion block and swivel stem and arranged beneath said collars, and a bushing carried by the lower end of said swivel stem and surrounding the lower extremity of the hose stem.

4. A hydraulic swivel including a trunnion block, a supporting bail therefor, an upstanding annular rim carried by said block, a swivel stem whose upper end extends up into and terminates within the block, a collar surrounding said swivel stem and resting upon the upper side of said trunnion block, a similar collar spaced above the first mentioned collar and surrounding the upper end of the swivel stem, a lock nut secured on said swivel stem and locking the last mentioned collar thereon, antifriction means interposed between said collars, a cap secured to the upper edge of said upstanding rim and entirely inclosing said collars, said antifriction means, said lock nut and the upper end of said swivel stem, a neck detachably secured to said cap, antifriction means interposed between said cap and lock nut and a hose stem within said swivel stem and independently rotatable relative thereto, whose upper end extends through said cap and is secured to the lower end of said neck.

In testimony whereof I have signed my name to this specification in the presence of two subscribing witnesses.

HARRY R. DECKER.

Witnesses:
  A. TOMPKINS,
  WILL C. GRIGSBY.